Figure 1:
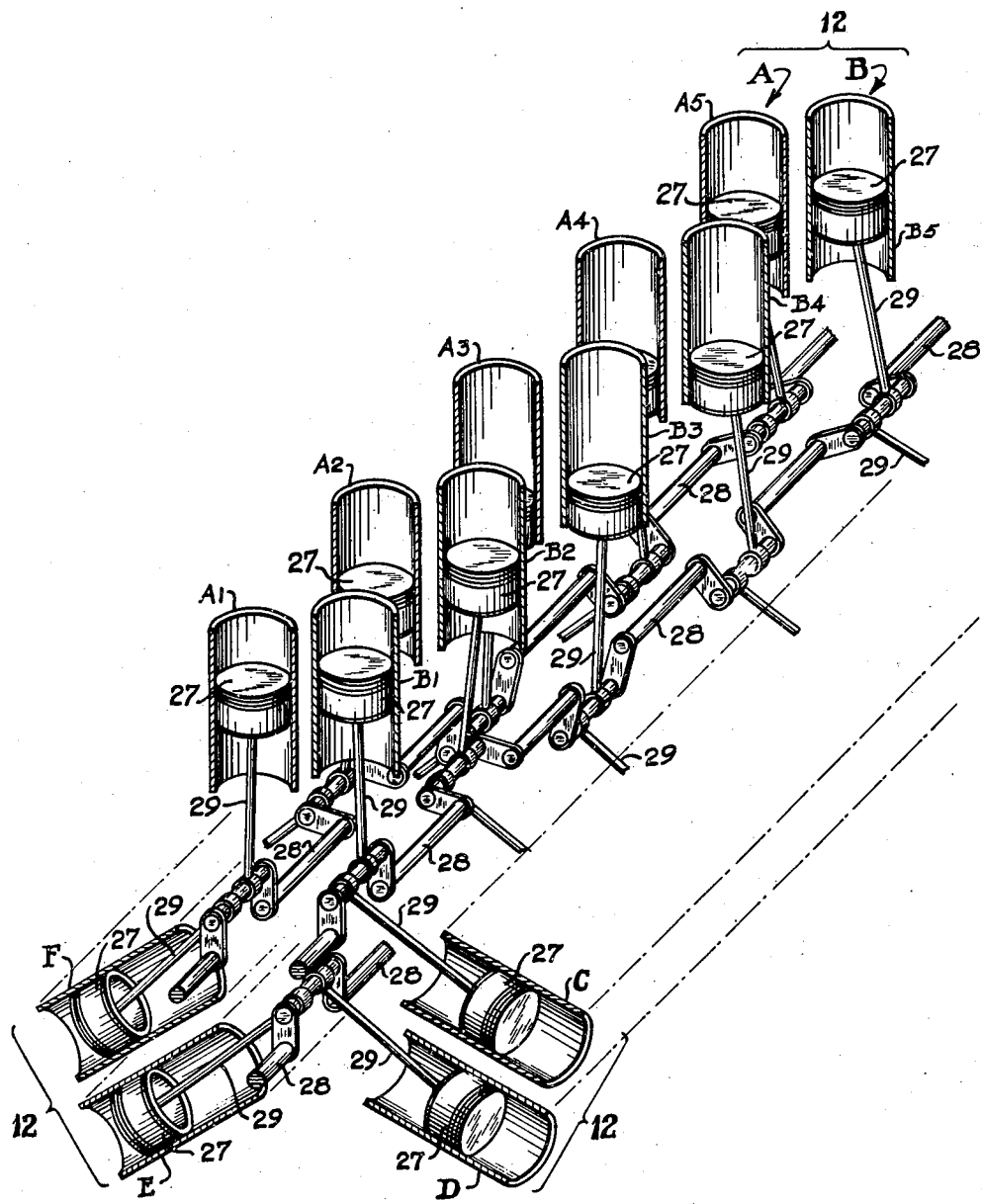

April 5, 1949.  W. G. LUNDQUIST  2,466,550
INTERNAL-COMBUSTION ENGINE

Filed March 9, 1944  14 Sheets-Sheet 1

INVENTOR
WILTON G. LUNDQUIST.
BY
ATTORNEY

April 5, 1949. W. G. LUNDQUIST 2,466,550
INTERNAL-COMBUSTION ENGINE
Filed March 9, 1944 14 Sheets-Sheet 2

INVENTOR
WILTON G. LUNDQUIST.
BY
ATTORNEY

INVENTOR
WILTON G. LUNDQUIST.
BY
ATTORNEY

April 5, 1949. W. G. LUNDQUIST 2,466,550
INTERNAL-COMBUSTION ENGINE
Filed March 9, 1944 14 Sheets-Sheet 4
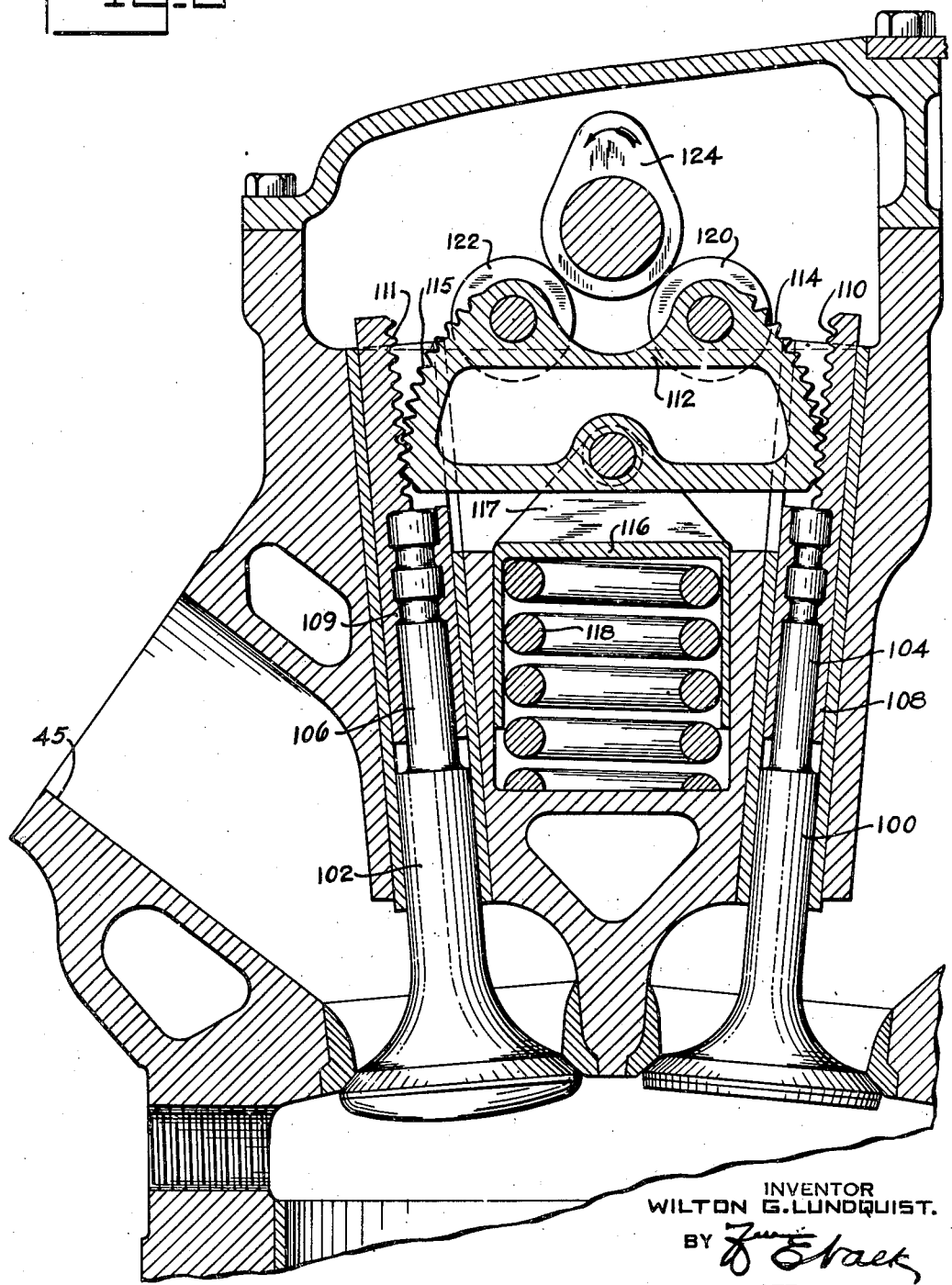
INVENTOR
WILTON G. LUNDQUIST.
BY
ATTORNEY April 5, 1949.  W. G. LUNDQUIST  2,466,550
INTERNAL-COMBUSTION ENGINE
Filed March 9, 1944  14 Sheets-Sheet 5
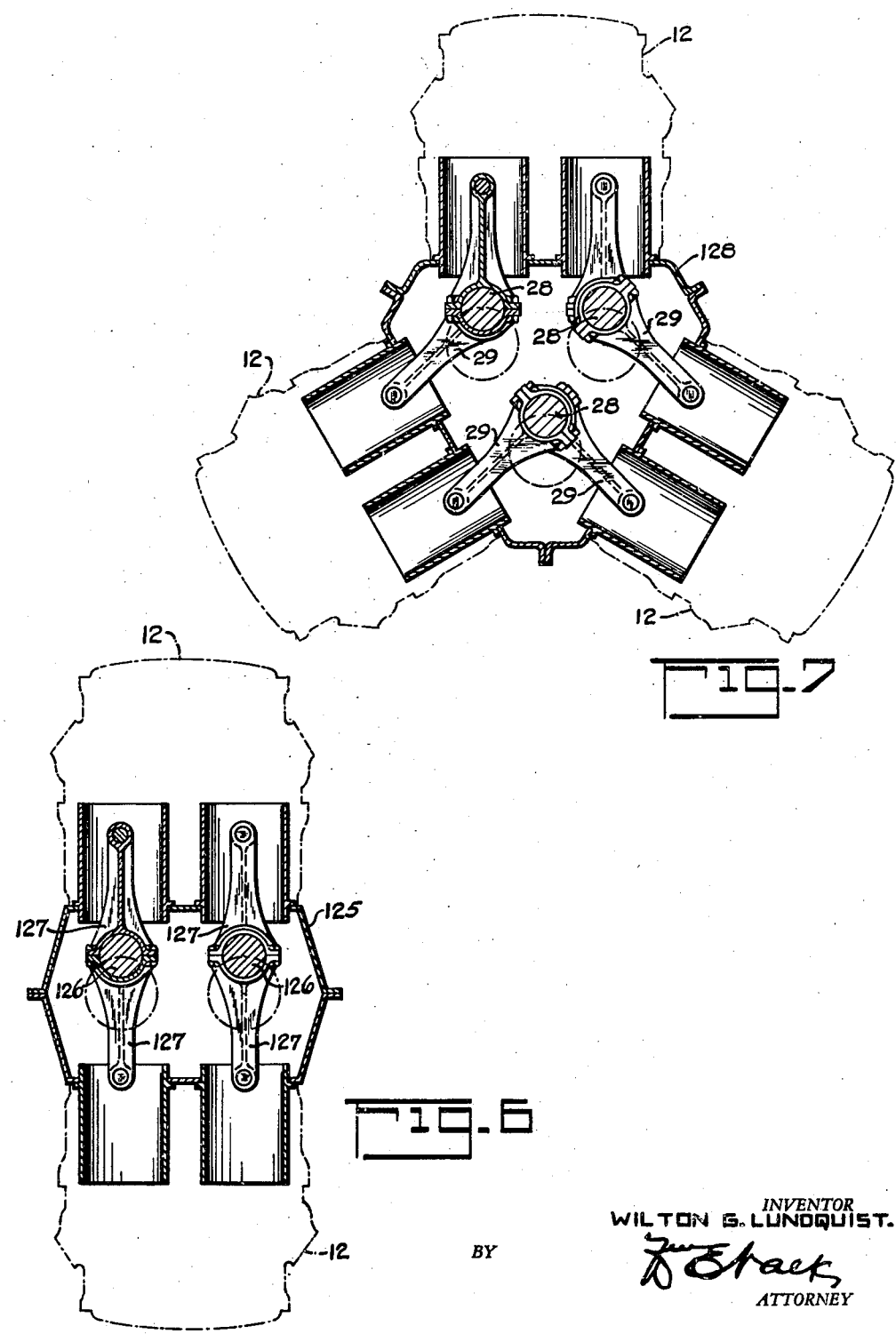
INVENTOR
WILTON G. LUNDQUIST.
BY
ATTORNEY April 5, 1949. W. G. LUNDQUIST 2,466,550
INTERNAL-COMBUSTION ENGINE
Filed March 9, 1944 14 Sheets-Sheet 6
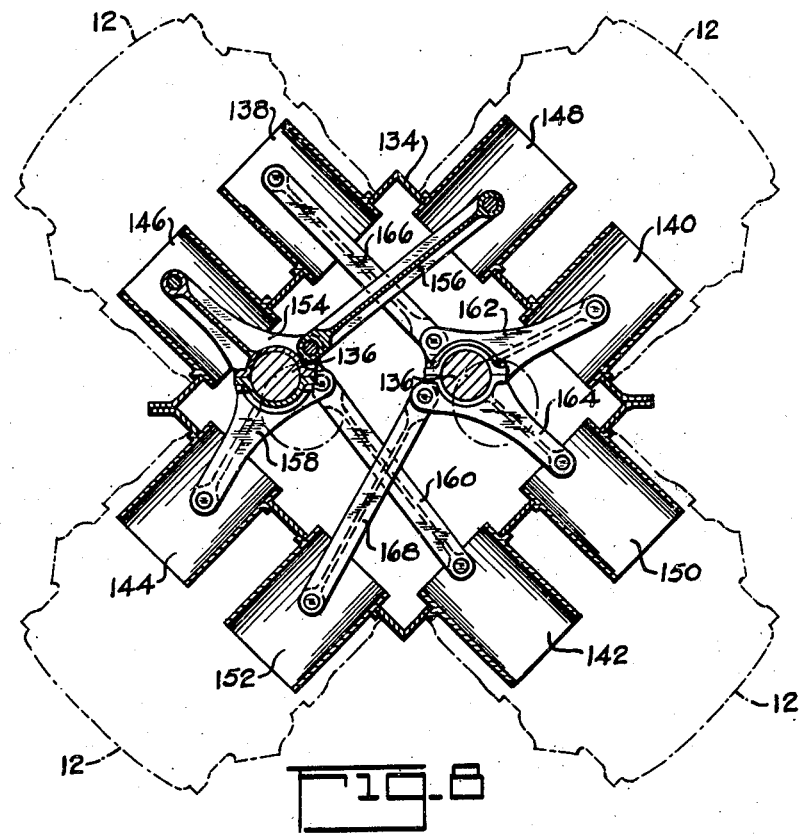
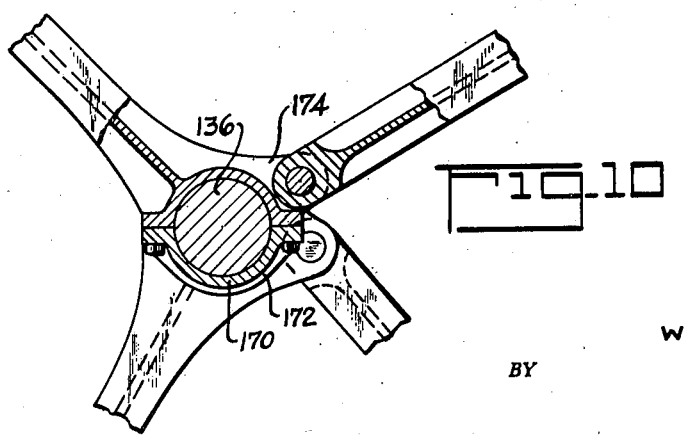
INVENTOR
WILTON G. LUNDQUIST.
BY
ATTORNEY April 5, 1949.    W. G. LUNDQUIST    2,466,550
INTERNAL-COMBUSTION ENGINE
Filed March 9, 1944    14 Sheets-Sheet 7
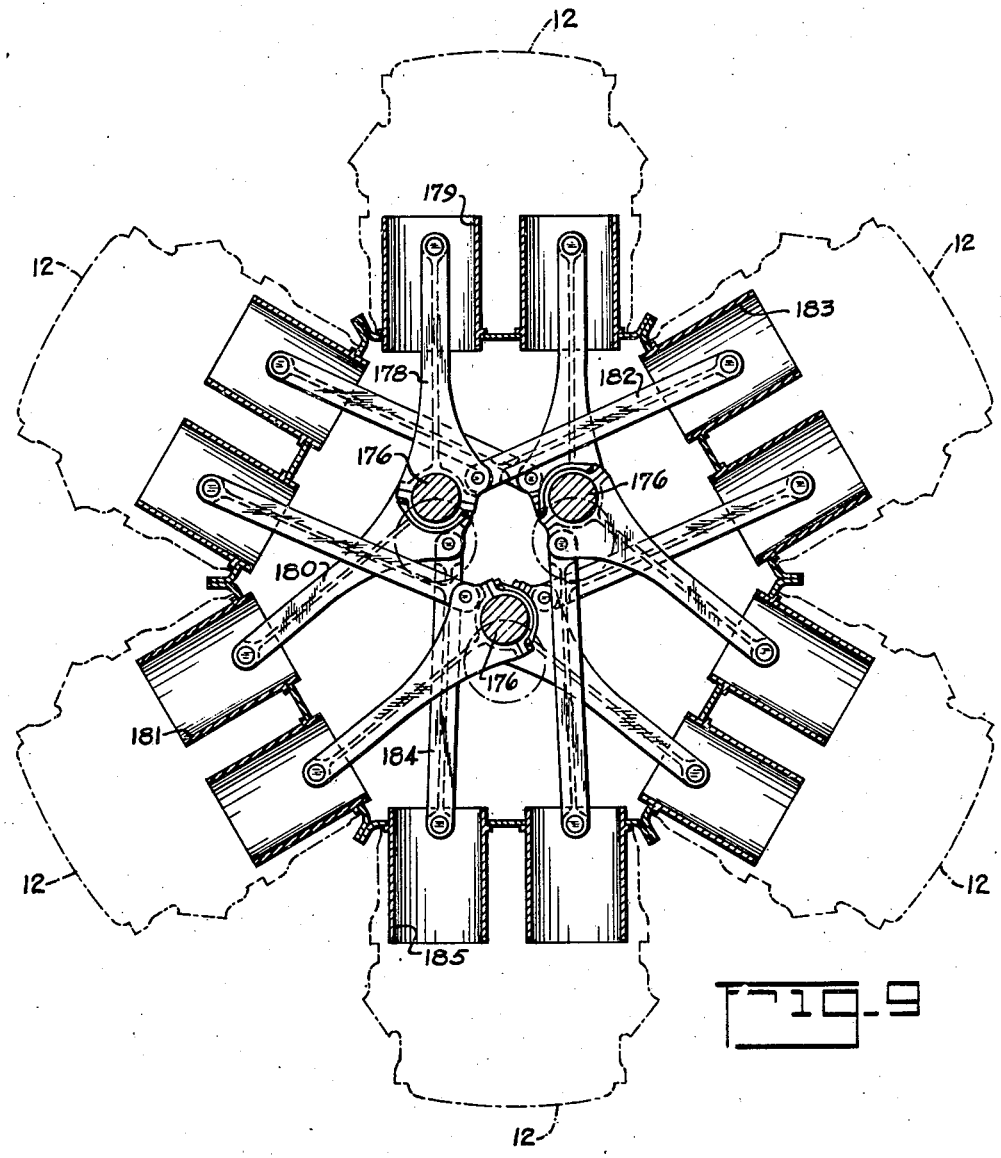
*INVENTOR*
WILTON G. LUNDQUIST.
BY
*ATTORNEY*

April 5, 1949. W. G. LUNDQUIST 2,466,550
INTERNAL-COMBUSTION ENGINE
Filed March 9, 1944 14 Sheets-Sheet 8
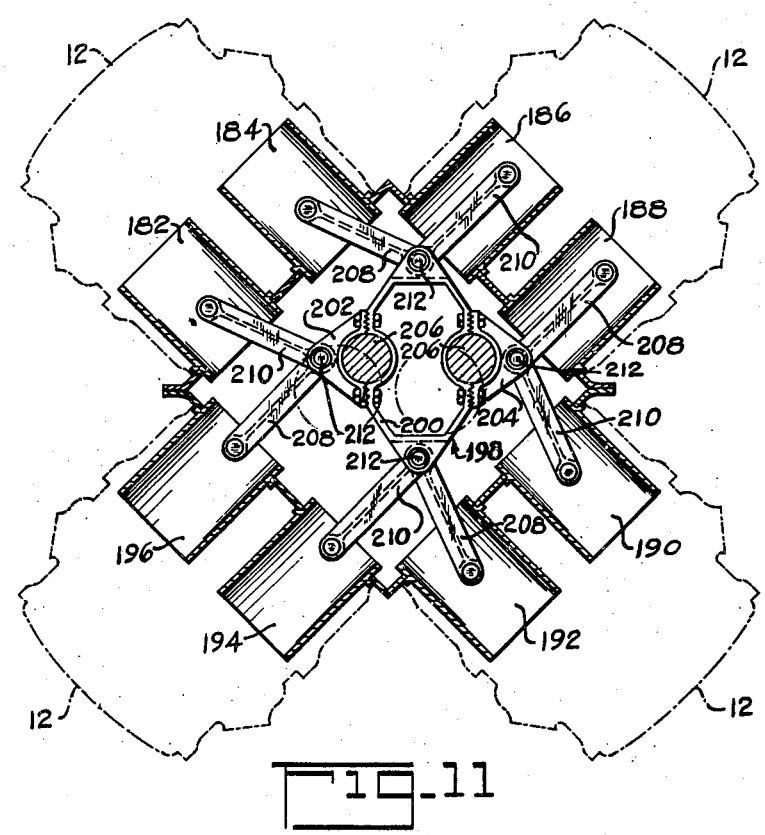
INVENTOR
WILTON G. LUNDQUIST.
BY
ATTORNEY April 5, 1949. W. G. LUNDQUIST 2,466,550
INTERNAL-COMBUSTION ENGINE
Filed March 9, 1944 14 Sheets-Sheet 9
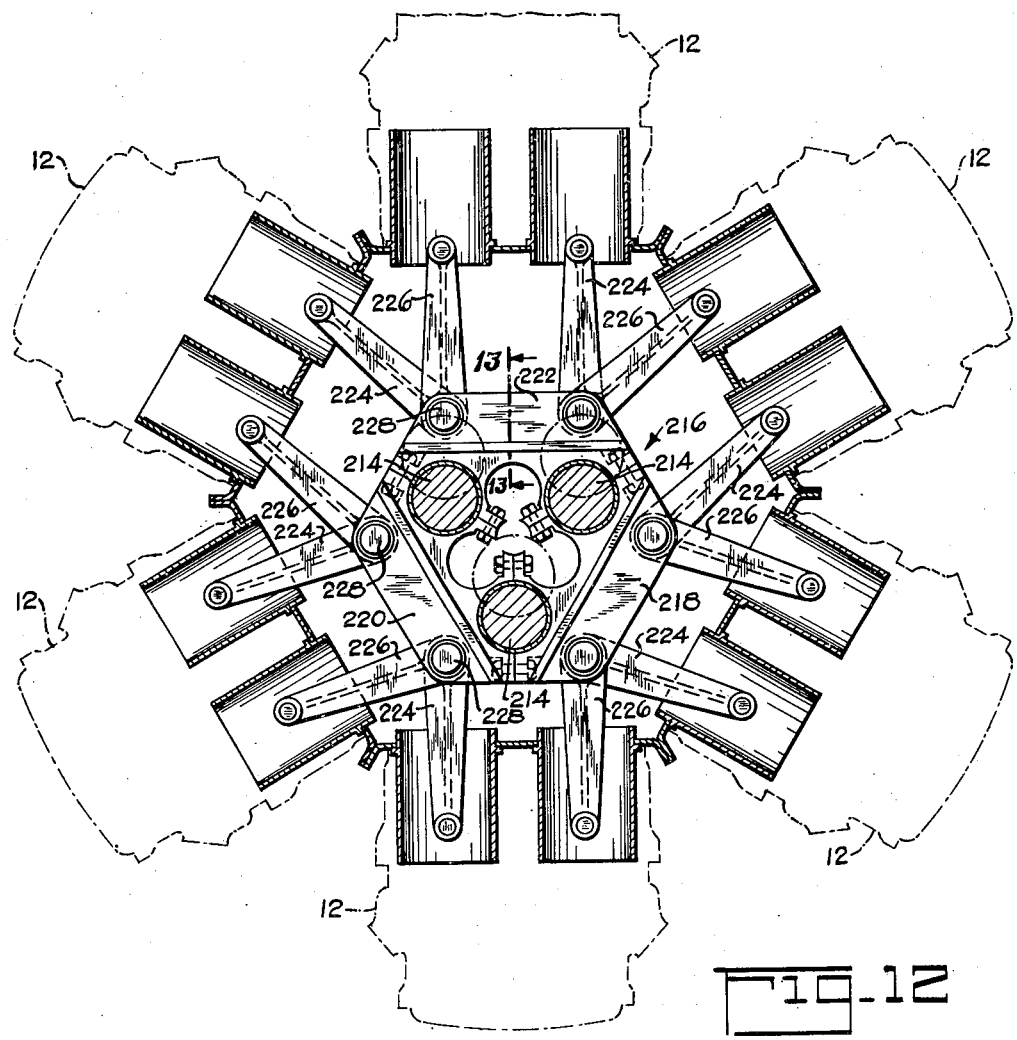
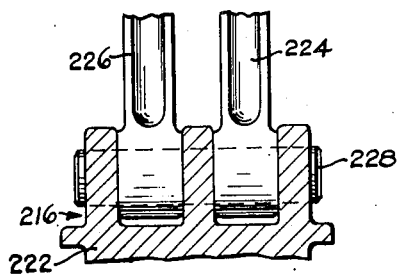
INVENTOR
WILTON G. LUNDQUIST.
BY
ATTORNEY April 5, 1949.  W. G. LUNDQUIST  2,466,550
INTERNAL-COMBUSTION ENGINE
Filed March 9, 1944  14 Sheets-Sheet 10
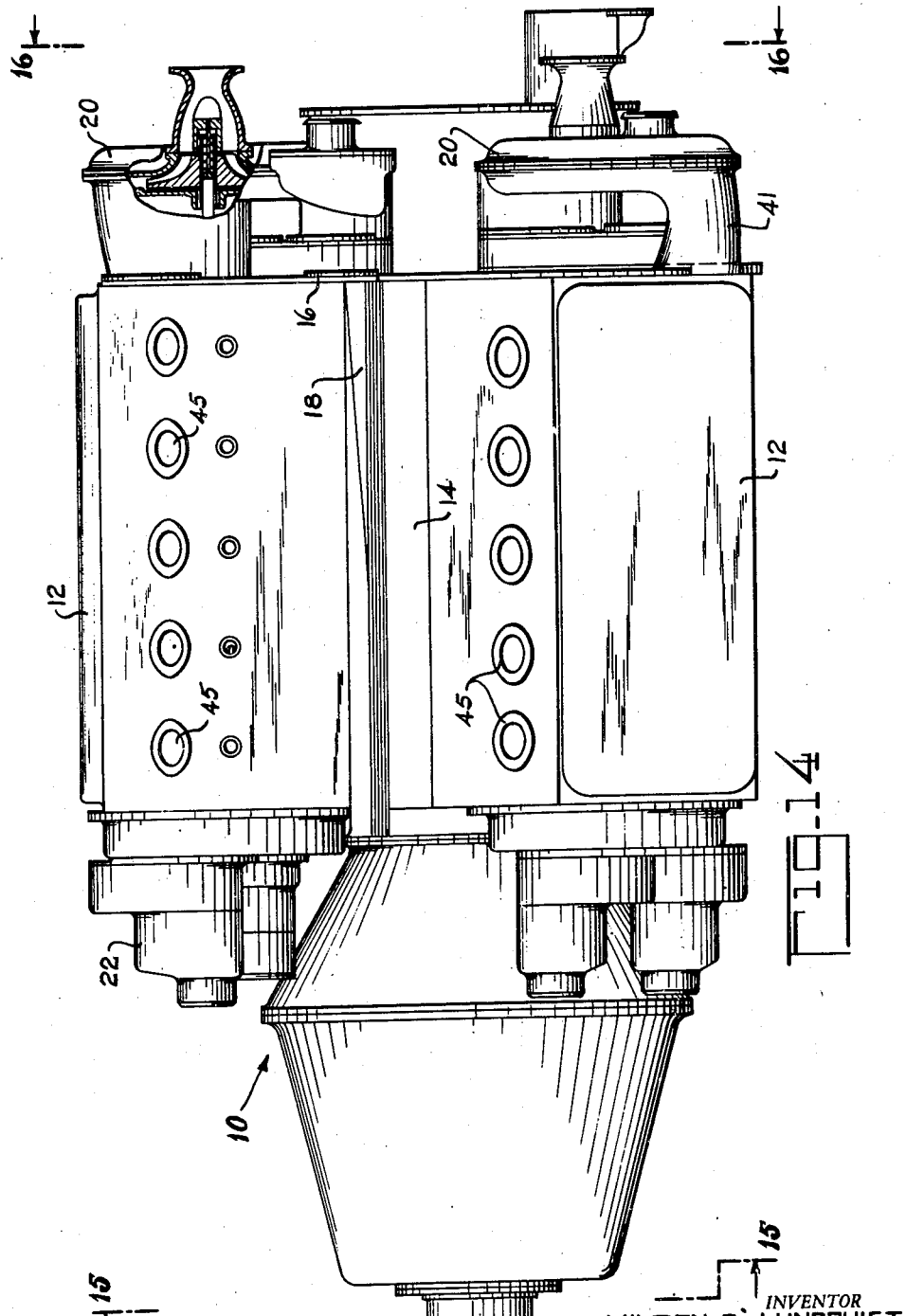
INVENTOR
WILTON G. LUNDQUIST.
BY
ATTORNEY

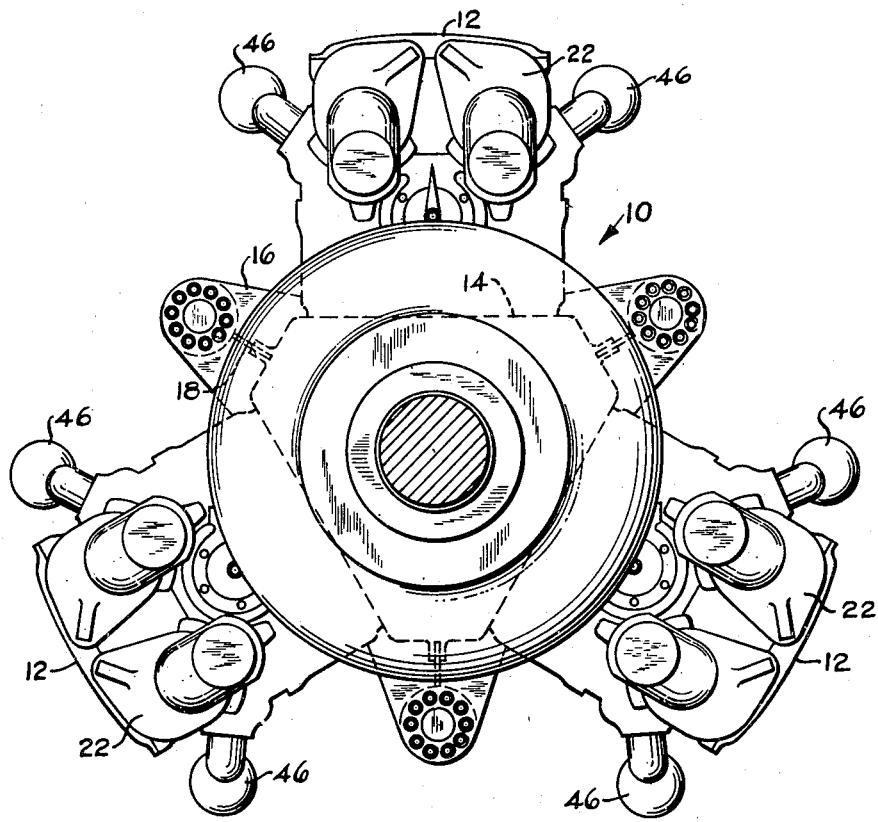

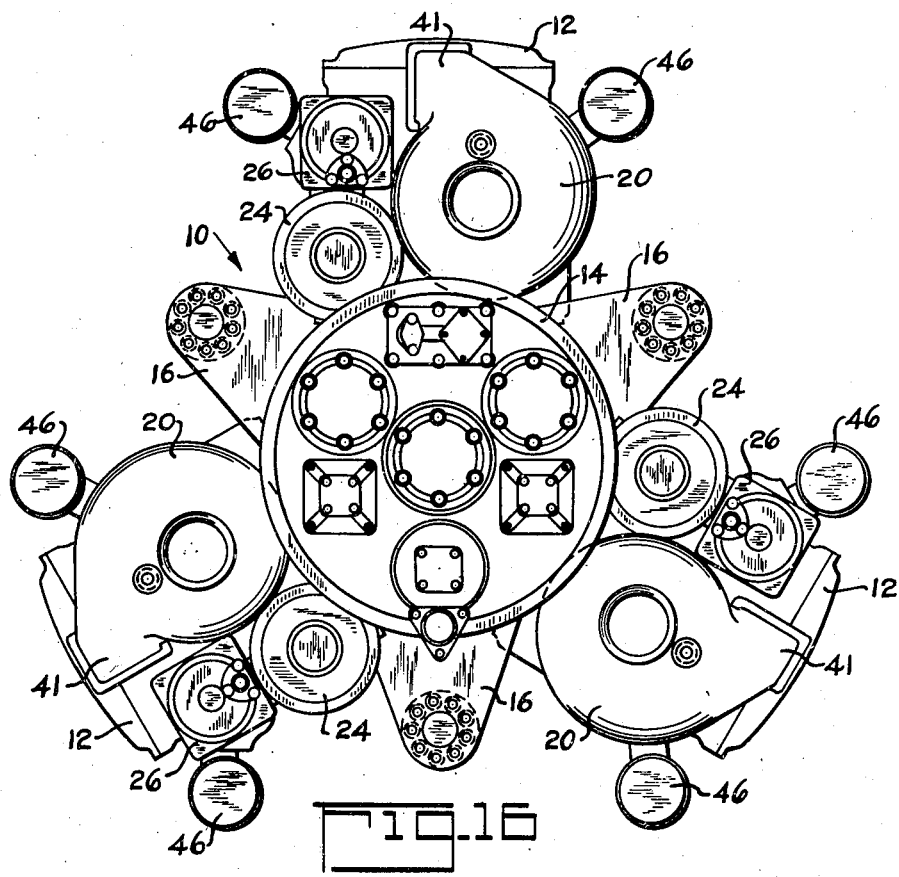

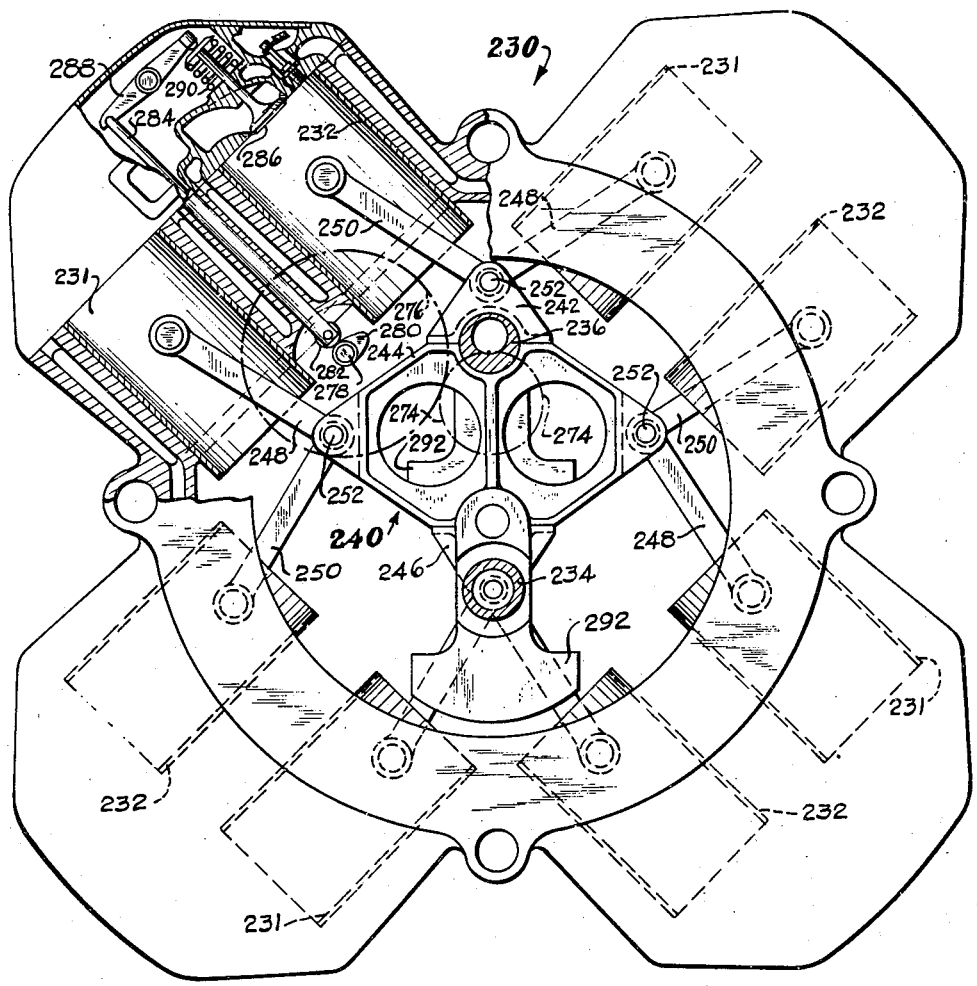

April 5, 1949.  W. G. LUNDQUIST  2,466,550
INTERNAL-COMBUSTION ENGINE
Filed March 9, 1944  14 Sheets-Sheet 14
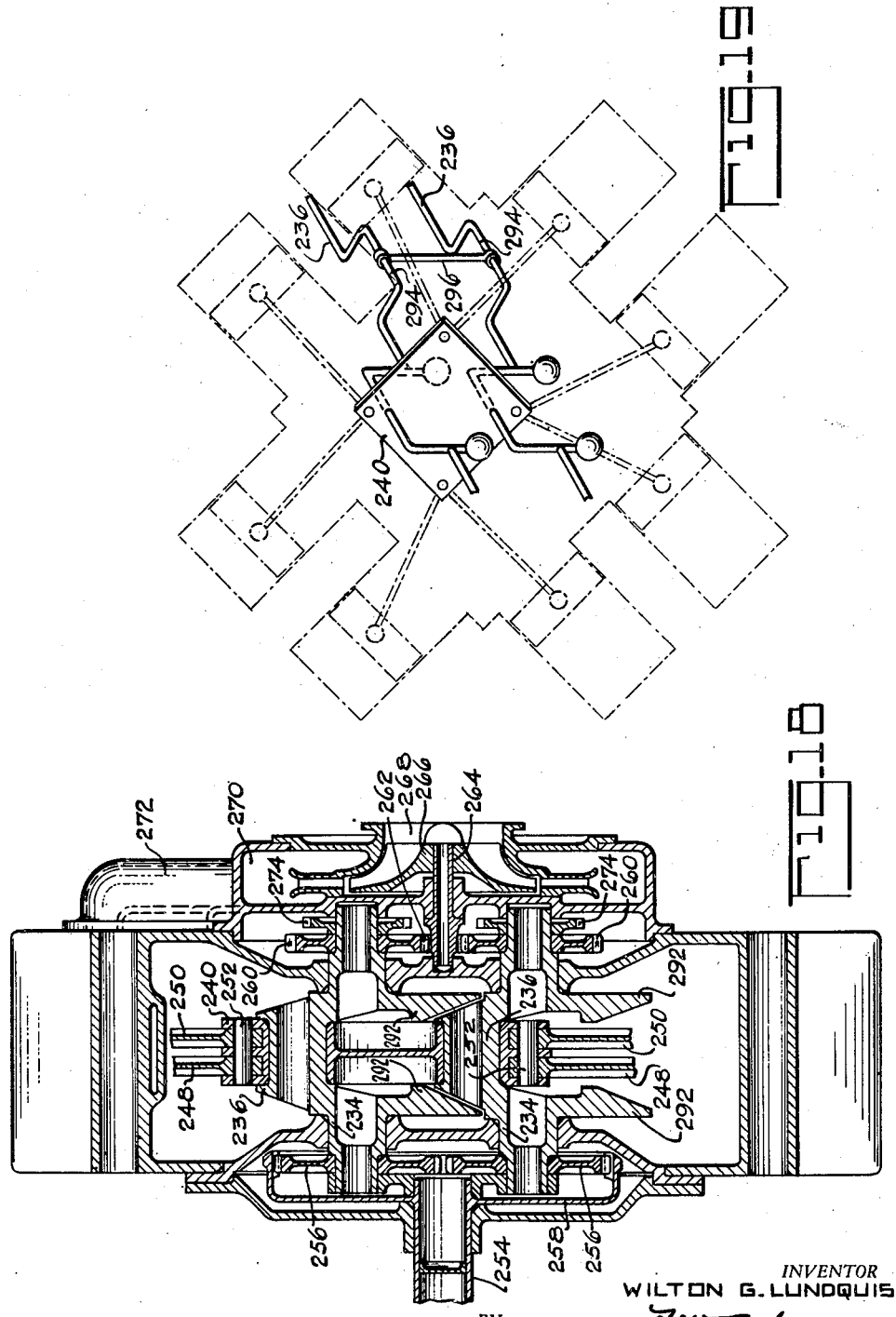
INVENTOR
WILTON G. LUNDQUIST.
BY
ATTORNEY Patented Apr. 5, 1949

2,466,550

UNITED STATES PATENT OFFICE 2,466,550

INTERNAL-COMBUSTION ENGINE

Wilton G. Lundquist, Hohokus, N. J., assignor to Wright Aeronautical Corporation, a corporation of New York Application March 9, 1944, Serial No. 525,748

21 Claims. (Cl. 123—52)

This invention relates to internal combustion engines and is more particularly concerned with the cylinder arrangement, valve gear, and connecting rod construction of an internal combustion engine.

It is an object of this invention to provide a multi-cylinder internal combustion engine in which the engine comprises a plurality of individual cylinder block units, each equipped with its own induction system, ignition system, coolant system, etc., whereby each of the individual cylinder blocks forms a complete power unit and may be tested and operated as such. Each cylinder block unit comprises a pair of parallel in-line cylinder rows with an odd number of cylinders in each row. In the case of a four-stroke cycle internal combustion engine, this arrangement permits a uniform firing sequence of the odd number of cylinders in each in-line row, and with the cylinders of the two rows 360° out of phase there is a uniform interval between the firing strokes of all the cylinders of one block. It is a further object of this invention to provide a multi-cylinder internal combustion engine which can be built up from one or more of such complete cylinder block engine units in such a way that there inherently is a uniform interval between the firing strokes of the individual cylinders. In this way the torque output of the engine becomes increasingly smooth as the size of the engine is increased by the addition of similar cylinder block units. Each cylinder block unit being a complete power unit in itself with its own ignition, induction, and coolant systems, the problem of increasing the size of the engine reduces itself to one of changing the design of the crankcase, crankshaft, and transmission thereof.

Specifically, the engine is buil up from one or more cylinder block units, each comprising a complete power unit and having two parallel in-line cylinder rows with an equal odd number of cylinders in each row, the various cylinder block units being radially disposed and symmetrically spaced about a tubular crankcase for the crankshaft structure. The size of such an engine can be increased by adding additional cylinder block units and providing a symmetrical spacing of the new number of cylinder block units.

It is a further object of this invention to provide a common air intake chamber between the pairs of in-line cylinder rows of each cylinder block unit, thereby eliminating complicated branch manifolding and making it possible to supercharge the cylinder spark plugs. It is a further object of the invention to provide a new and improved valve gear providing a relatively narrow cylinder head structure in order to provide as large an intake chamber as possible between the cylinder rows of each block. The intake chamber should be quite large in order to insure a substantially uniform pressure throughout the chamber and to insure that the velocity of the combustion air at any point within the chamber is relatively low as compared to the velocity through the various cylinder intake passages.

In addition, it has been found that a transverse slice through a multi-cylinder engine comprising four, six, eight, etc., of such radially disposed two-row cylinder block units cutting off one bank of cylinders, defines an ideal engine in which the shaking force, having a frequency higher than the crankshaft speed, are inherently balanced. Therefore, it is a further object of this invention to provide a new and improved internal combustion engine comprising four, six, eight, etc., pairs of cylinders.

Figure 2:
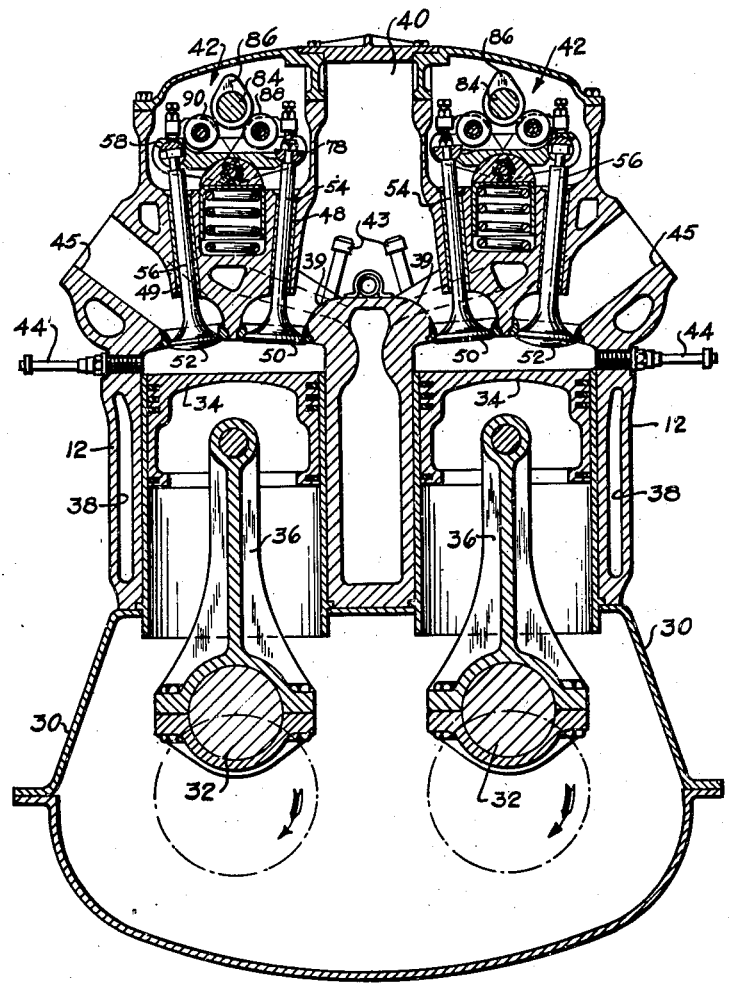
Figure 3:
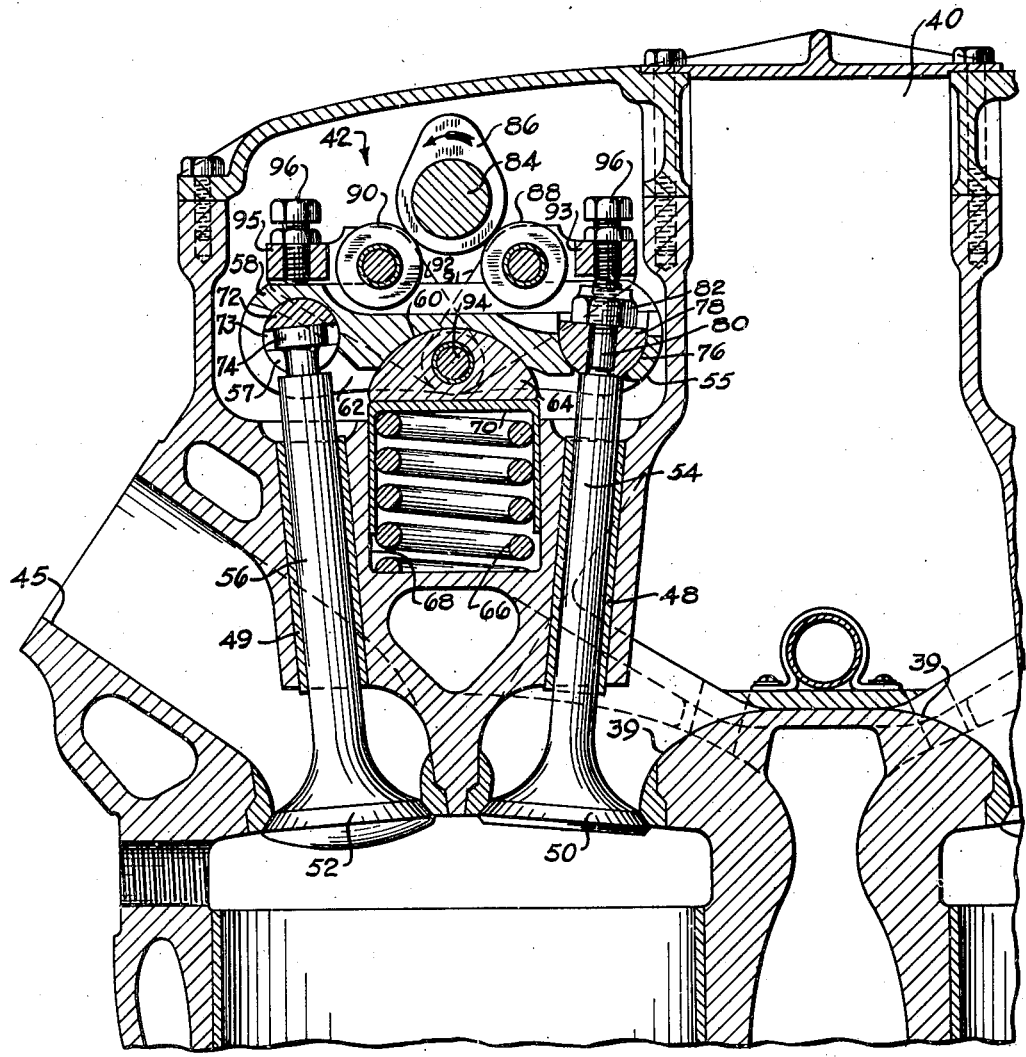
Figure 4:
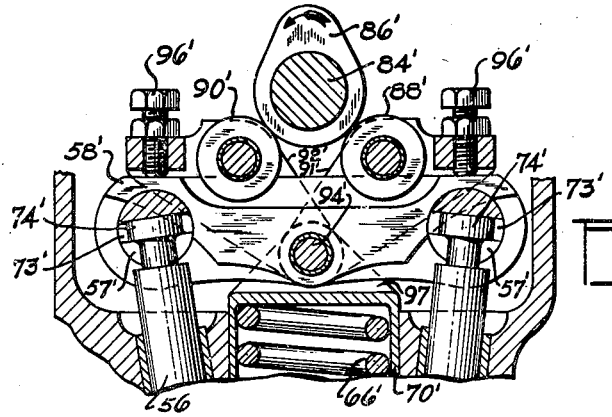

Other objects of this invention will become apparent upon reading the annexed detailed description in connection with the drawing in which:

Fig. 1 is a schematic view of an internal combustion engine embodying the invention, Fig. 2 is a transverse section through an internal combustion engine comprising only one of the cylinder block units embodying the invention, Fig. 3 is an enlarged sectional view of the valve gear illustrated in Fig. 1, Fig. 4 illustrates a modification of Fig. 3, Fig. 5 is an enlarged sectional view of a further modified form of valve gear, Figs. 6, 7, 8 and 9 are transverse sectional views through an internal combustion engine, respectively comprising 2, 3, 4 and 6 cylinder block units, Fig. 10 is an enlarged view of a portion of Fig. 8, Figs. 11 and 12 are transverse sectional views of modified forms of an internal combustion engine having four and six cylinder block units respectively, Fig. 13 is a sectional view on line 13—13 of Fig. 12, Figs. 14, 15 and 16 are side, front and rear elevational views of an internal combustion engine embodying the invention, Fig. 17 is an end view partly in section of a new and improved eight-cylinder internal combustion engine, Fig. 18 is an axial section through Fig. 17, and Fig. 19 is a schematic view illustrating a modification of Figs. 17 and 18.

Referring to the drawing, particularly to Figs. 14, 15 and 16, an internal combustion engine 10 is illustrated as comprising three similar radially disposed cylinder block units 12, mounted about the crankcase 14. Mounting plates 16 are provided for supporting the engine and these plates are formed integral with or are secured to the rear wall of the crankcase 14, and they are provided with triangular gusset plates 18 extending forwardly therefrom and secured to the longitudinal corners of the crankcase to help support the engine. This type of mounting does not interfere with the support for each cylinder block on the crankcase, and, therefore, facilitates replacement of the individual cylinder blocks when necessary while the engine is installed in an aircraft or other vehicle. Each of the cylinder block units 12 is a complete power unit in itself, being provided with its own supercharger 20, magneto 22, liquid coolant pump 24, fuel injector pump 26, etc.

As best seen in Fig. 1, each of the cylinder block units 12 comprises a pair of in-line cylinder rows with an equal odd number of cylinders in each row and with all its cylinders having parallel axes. Such an arrangement permits the cylinders of each cylinder block unit 12 to fire at uniform intervals with the adjacent cylinders of each row 360° out of phase as regards the engine cycle, but in phase as regards the motion of their pistons, the engine having a conventional four-stroke cycle. Thus, the two rows of cylinders making up a cylinder block unit 12 are each respectively connected to a multi-throw crankshaft in which the crankshaft crankarms are spaced at 360°/N where N is the number of cylinders per row, the crankarms of the two crankshafts serving a cylinder block unit 12 being disposed in phase with each other. Accordingly, the adjacent cylinders of each row are in phase as regards motion of their pistons and they may be arranged to fire 360° out of phase as regards engine cycle.

If a plurality of such cylinder block units 12, having a pair of in-line cylinder rows with the same odd number of cylinders in each row, are symmetrically disposed about a tubular crankcase with the crankshafts all rotating in phase, then except when the number of cylinder block units is the same as the number of cylinders in each row, the arrangement inherently provides for only one cylinder firing at any one time and for the cylinders firing at uniform intervals. Thus, considering any one cylinder block unit, the cylinders fire at uniform intervals equal to 360°/N where N is the number of cylinders per row. In view of the fact that similar cylinder block units 12 have the same uniform firing interval, then, if the angular displacement of the various similar cylinder block units 12 is different from 360°/N, no two cylinders will ever fire at the same time, and because of the symmetry of the arrangement of all the cylinder block units 12 there inherently will be a uniform interval between all the firing strokes.

Fig. 1 is a diagrammatic perspective view of the cylinder, connecting rod, and crankshaft arrangement of the engine 10 comprising three symmetrically disposed cylinder block units 12, and in which each cylinder block unit comprises a pair of in-line cylinder rows having five cylinders per row. The pistons 27 of the three cylinder block units 12 are connected to three crankshafts 28, each serving two adjacent cylinder rows of adjacent cylinder block units. The throws of the three crankshafts 28 are all in phase and are arranged to provide a uniform firing interval between the cylinders of each row; that is, one of the five cylinders of each row will fire every 144°. Preferably, and as illustrated, the cylinders of each row have a 1, 3, 5, 2, 4 firing order; that is, after the first cylinder of a row A fires (cylinder A1), cylinder A3 will fire 144° later, cylinder A5 will fire 144° after the A3 cylinder, cylinder A2 will fire 144° after the A5 cylinder, and cylinder A4 will fire 144° after the A2 cylinder. In each of the cylinder block units 12, the adjacent cylinders of the two cylinder rows of the block are 360° out of phase as regards engine cycle, and, therefore, the cylinders of row B are 360° out of phase as regards engine cycle from the cylinders of row A. The cylinder block unit comprising the cylinder rows C and D is angularly disposed 120° from the cylinder block unit comprising the rows A and B, and, therefore, each cylinder of row C will fire 120° after the corresponding cylinder of row A, and each cylinder of row D will fire 120° after the corresponding cylinders of row B. That is, the C1, C2, C3, C4 and C5 cylinders will fire 120° of crankshaft rotation after cylinders A1, A2, A3, A4 and A5, respectively, and the cylinders D1, D2, D3, D4 and D5 will fire 120° after cylinders B1, B2, B3, B4 and B5, respectively. Similarly, each of the cylinders of row E will fire 120° after the corresponding cylinders of row C, and the cylinders of row F will fire 120° after the corresponding cylinders of row D. In this manner the relative firing order of the cylinders of an engine comprising three cylinder block units 12 may readily be determined and the results tabulated as follows:

| Phase Relation of the Firing Strokes, in Degrees | Cylinders of Bank #1 | Cylinders of Bank #2 | Cylinders of Bank #3 | Cylinders of Bank #4 | Cylinders of Bank #5 |
|---|---|---|---|---|---|
| 0 | A | | | | |
| 24 | | | F | | |
| 48 | | | | | D |
| 72 | | B | | | |
| 96 | | | | E | |
| 120 | C | | | | |
| 144 | | | A | | |
| 168 | | | | | F |
| 192 | | D | | | |
| 216 | | | | B | |
| 240 | E | | | | |
| 264 | | | C | | |
| 288 | | | | | A |
| 312 | | F | | | |
| 336 | | | | D | |
| 360 | B | | | | |
| 384 | | | E | | |
| 408 | | | | | C |
| 432 | | A | | | |
| 456 | | | | F | |
| 480 | D | | | | |
| 504 | | | B | | |
| 528 | | | | | E |
| 552 | | C | | | |
| 576 | | | | A | |
| 600 | F | | | | |
| 624 | | | D | | |
| 648 | | | | | B |
| 672 | | E | | | |
| 696 | | | | C | |
| 720 | A | | | | |

From the above table it is readily apparent that no two cylinders fire at any one time, and that there is a uniform firing interval of 24° between the crankshaft positions at which the various cylinders fire. Thus, after cylinder A1 fires, the F3 cylinder fires 24° later, the D5 cylinder fires 48° after the A1 cylinder, the E4 cylinder fires 96° after the A1 cylinder, etc. A change in the firing order of the cylinders of each row merely changes the particular sequence in which all the cylinders fire, but does not disturb the uniform firing interval.

A similar table could be made up for engines comprising cylinder block units of different sizes and/or number with the same result; namely, that no two cylinders fire at any one time and the cylinders have a uniform firing interval, the only limitation being that each cylinder row comprises an odd number of cylinders and that the number of cylinder block units 12 differs from the number of cylinders per row.

If the number of cylinder block units 12 is equal to N, the number of cylinders in each row, then the angular displacement of the various cylinder block units will be 360°/N which, as previously pointed out, is also the firing interval between the cylinders of any one block. Therefore, the firing stroke of any one cylinder of one cylinder block unit will coincide with the firing stroke of one cylinder of the other cylinder block units if the number of cylinder block units is equal to the number of cylinders per row. Aside from this limitation, once a satisfactory cylinder block unit 12 has been developed, the size of the engine may be readily increased by symmetrically disposing additional cylinder block units with the result that no two cylinders fire at any one time and that there is a uniform firing interval between the various firing strokes.

For reasons of clarity in Fig. 1 the individual cylinders of each cylinder block unit have only been illustrated for the upper cylinder block unit 12, but it should be understood that the lower two cylinder block units have a similar number and arrangement of cylinders. Also, only two of the crankshafts 28 are completely illustrated, but the crank arms of the other crankshaft are similarly disposed and are all in phase therewith. In addition, considering the upper cylinder block unit 12 of Fig. 1, the cylinders or row A are displaced slightly forwardly from the cylinders of row B, and the cylinder rows of each of the other cylinder block units 12 are similarly offset. This arrangement permits the use of similar side-by-side connecting rods 29 between the pistons 27 and the crankshafts 28, and eliminates the necessity of providing forked connecting rods.

Fig. 2 is a transverse sectional view through an engine comprising but one of the cylinder block units 12 which is mounted on a crankcase 30 for a pair of multi-throw crankshafts 32. The crankshafts 32 are suitably geared together, for example, as illustrated in connection with the modification of Figs. 17 and 18. Each of the crankshafts is connected to the pistons 34 of their respective in-line cylinder rows by connecting rods 36. As illustrated in Fig. 2, the cylinder block units 12 include a liquid cooled jacket 38 disposed about its two parallel in-line cylinder rows, each row having an odd number of cylinders per row with their cylinder bores disposed parallel to each other. The intake ports 39 of the cylinders of each row face each other from their cylinder heads, and an induction manifold chamber 40 occupies the space between the cylinder heads of the two parallel in-line cylinder rows. With this arrangement, complicated branch manifolding between the induction manifold chamber and the cylinder intake ports is eliminated. Obviously, this advantage is present regardless of the number of cylinders per in-line cylinder row.

Each cylinder head is provided with a valve gear 42 which is designed to be quite narrow in order that the induction chamber 40 between the pair of cylinder rows is as large as possible. The air supply to the induction chamber 40 is compressed by the supercharger 20 and delivered to the chamber 40 through the supercharger discharge conduit 41. Spark plugs 43 extend into the cylinders from the chamber 40, whereby the spark plugs 43 and their ignition wires are supercharged by the air pressure within the chamber 40. Preferably, a second set of spark plugs 44 is also provided on the other side of the engine cylinders. Exhaust ports 45 of each row of cylinders open to the outer sides of their associated cylinder block units and are connected to exhaust manifolds 46 (the exhaust manifolds 46 being illustrated in Figs. 15 and 16). The arrangement of the induction chamber 40 with the spark plugs 43 extending therein provides for supercharging of these spark plugs and their ignition wires. Obviously, this feature may be used with cylinder arrangements other than that herein illustrated and described.

As best seen in the enlarged view of Fig. 3, each cylinder head is provided with valve guides 48 and 49 for its intake and exhaust valves 50 and 52, having valve stems 54 and 56 respectively. The valve gear 42 for operating the valves of its associated cylinder comprises a frame or rocker member 58 disposed between each pair of valve stems, and the ends of the rocker member 58 are provided with push-pull connections 55 and 57 with the adjacent valve stems 54 and 56, respectively. The rocker member 58 is also provided with a cylindrical seat 60 between its side flanges 62, and this cylindrical seat 60 is engageable by a segmental cylindrical bearing member 64. A valve spring 66 is engageable at its one end with the cylinder head within a recess 68, and a cup-shaped guide sleeve 70 is disposed over the other end of the valve spring with the end of the cup-shaped sleeve 70 forced against the flat side of the bearing member 64 by the spring 66. With this arrangement, a single valve spring 66 for the valve gear of each cylinder is operative to urge both the intake and exhaust valves of the cylinder in a closing direction.

Any suitable push-pull connection may be provided between the rocker member 58 and its associated valve stems. As illustrated, the push-pull connection 57 between the rocker member 58 and the exhaust valve stem 56 is similar to that disclosed in the copending application of R. Chilton Serial No. 418,649, filed November 12, 1941, now patent No. 2,404,827. Briefly, this push-pull connection comprises a trunnion member 72 extending across the rocker member 58 and journaled therein. This trunnion member 72 is provided with a T-shaped slot 73 for the reception of a T-shaped head 74 formed on the end of the exhaust valve stem 56. In assembling this push-pull connection, the T-shaped head end 74 of the valve stem 56 is inserted from the end of the rocker member 58, and, therefore, for reasons of assembly, a similar push-pull connection cannot be provided between the other end of the rocker member and the intake valve stem 54 unless the rocker member 58 is longitudinally split, as in Fig. 4. Instead, in Fig. 3 the push-pull connection 55 between the rocker member 58 and the valve stem 54 comprises a spherical seat 76 on the rocker member 58 engageable by a spherical washer 78 which is secured to a reduced diameter end portion 80 of the valve stem 54 by a nut 82. Thus, a universal push-pull connection is provided between each end of the rocker member 58 and the adjacent valve stems.

An engine driven cam shaft 84 provided with cams 86 extends across each row of cylinders, and each of the cams is adapted to engage cam follower rollers 88 and 90, respectively, supported adjacent the ends of a rocker member 58. Each of the cam follower rollers 88 and 90 is respectively carried by forked levers 91 and 92, pivotally secured to the bearing member 64 by a transverse pin 94. The forked levers 91 and 92 are provided with head portions 93 and 95, respectively, straddling the ends of their associated rocker member 58, which head portions are provided with adjusting screws 96 adapted to engage the adjacent end of the rocker member 58. The sides 62 of the rocker member 58 are provided with clearance slots (not shown) about the pin 94 to permit relative motion therebetween.

With this construction of the valve gear 42, the spring 66 urges both valves in a closing direction, and upon engine operation the cam 86, upon engaging the roller 90, causes the rocker member 58 to pivot about its push-pull connection with intake valve stem 54 against the spring 66, thereby opening the exhaust valve. Further rotation of the cam 86 permits the spring 66 to close the exhaust valve. After operating the exhaust valve, the cam 86 engages the cam follower roller 88 to cause the rocker member 58 to pivot about its push-pull connection 57 with the valve stem 56 against the spring 66, thereby opening the intake valve, further rotation of the cam 86 permitting the spring 66 to close the intake valve. The motion of the cam follower rollers is transmitted to the rocker member 58 through their adjusting screws 96, whereby the screws 96 permit adjustment of the cam to cam follower clearance.

Summarizing, the valve gear 42 for each cylinder comprises a single rocker member 58 having a push-pull connection with both cylinder valves, and each of the cylinder valves is urged in a valve closing direction by a single spring engaging the rocker member. The rocker member is operatively connected to a pair of cam followers which are arranged for engagement by a single engine driven cam to effect operation of the valves. This valve gear 42 has the advantage of being quite narrow, thereby providing a relatively large induction chamber 40 between the in-line cylinder rows of each cylinder block unit 12. The chamber 40 should be as large as possible in order that the air pressure therein is substantially uniform throughout the chamber, and so that the velocity of the air at any point within the chamber is substantially less than the air velocity through the intake passage 39.

The valve gear 42 for each of the cylinders has several additional advantages. Thus, since the valve gear 42 for each pair of cylinder valves comprises but one spring, whereas the conventional valve gear requires one spring for each cylinder valve, the valve gear 42 as hereinabove described eliminates and saves the weight of one of these springs. Also, in the conventional valve gear, each valve is urged in a closing direction by a helical valve spring surrounding the valve stem, while in the valve gear 42 the single valve spring 66 does not surround either of the valve stems, thereby facilitating valve cooling by permitting a long valve guide contact. In addition, since the rocker member 58 pivots about the push-pull connection at its ends and since the valve spring engages the center of the rocker member, the stroke of the valve spring is only one half that of the valves; whereas, in a conventional valve gear each valve spring has the same stroke as its associated valve. In view of the relatively short stroke of the valve spring 66, this spring can be made of wire having a larger cross sectional area than the conventional valve springs, and, therefore, of a correspondingly higher natural frequency. Furthermore, since the rocker member 58 is supported at both its ends by its push-pull connection with its associated valve stems, the usual rocker arm supporting brackets are not required.

In the valve gear 42 the flat engaging sides between the bearing member 64 and the end of the valve spring guide 70 permit relative sliding movement therebetween. This is essential because, as the rocker member 58 pivots about its push-pull connection 55, the valve spring guide 70 does not pivot therewith, but instead is depressed along a linear path. The push-pull connection 57 permits relative sliding motion of the rocker member 58 and valve stem 56 transverse to the axis of the valve stem 56. Therefore, if a similar push-pull connection were provided between the rocker member 58 and the valve stem 54, the sliding engagement between the rocker member 58 and the valve spring guide 70 could be eliminated. This modification is illustrated in Fig. 4.

In Fig. 4 the valve spring guide 70' is provided with a pair of upwardly extending ears 97 adapted to straddle a rocker member 58', and a pin 94' pivotally connects the valve spring guide ears 97 with the rocker member 58'. The rocker member 58' differs from the rocker member 58 of Fig. 3 in that the same push-pull connection 57' is provided between each valve stem and the ends of the rocker member 58', the push-pull connection 57' being similar to the push-pull connection 57 of Fig. 3. Also, the rocker member 58' is longitudinally split into two halves in order to permit its assembly with the push-pull connection 57', whereupon the two halves are bolted or otherwise secured together. As in Fig. 3, cam followers 88' and 90', carried by forked levers 91' and 92', respectively, are pivotally mounted about the pin 94', and are provided with adjusting screws 96'. With this construction, an intermediate portion of the rocker member 58' is constrained by the valve spring guide 70' to reciprocate along a linear path with the pin 94', the T-shaped slots 73' in the ends of the rocker member 58' sliding transversely across the associated T-shaped valve stem heads 74' when the engine driven cam 86' operates to pivot the rocker member for operating the valves. This construction thereby eliminates the sliding engagement between the rocker member and the valve spring guide of Fig. 3.

A further modified form of valve gear is illustrated in Fig. 5. In this modification the intake and exhaust valve stems 100 and 102 are provided with reduced diameter end portions 104 and 106. Split sleeves 108 and 109 are disposed between the reduced diameter end portions 104 and 106, respectively, and the associated valve stem guide. Each of the split sleeves and its associated valve stem is provided with one or more interfitted annular grooves and flanges to provide a push-pull connection therebetween. Racks 110 and 111 are formed on extensions of the split sleeves 108 and 109, respectively, and a rocker member 112 is provided with gear teeth 114 and 115 at its ends engageable with the adjacent rack. The rocker member 112 is pivotally secured to a pair of ears 117 extending from the end of a cup-shaped valve spring guide 116, and a valve spring 118 disposed within a recess within the cylinder head acts against the end of the valve spring guide 116 to urge both valves in a closing direction as in Figs. 3 and 4. A pair of cam follower rollers 120 and 122 are pivotally mounted upon the rocker member adjacent its ends. If desired, the rollers 120 and 122 may be adjustably mounted relative to an engine driven cam 124 as in Figs. 3 and 4. In operation the engine driven cam 124 engages the cam follower 122 to cause the rocker member 112 to pivot against the spring 118 and open the exhaust valve through the rack and gear connection 111, 115, the rack and gear connection 110, 114 between the rocker member 112 and the closed intake valve providing the necessary reaction. Similarly, when the cam 124 engages the cam follower 120, it causes the rocker member 112 to pivot against the spring 118 to open the intake valve.

As previously stated, the size of the engine may be increased by adding additional cylinder block units 12. Thus, Fig. 6 is a transverse section through an engine similar to Fig. 2, but comprising two diametrically opopsed cylinder block units 12 mounted on opposite sides of a crankcase 125. The opposed cylinders of the two cylinder block units have their pistons connected to the same crank arm of one crankshaft of a pair of multi-throw crankshafts 126 by connecting rods 127, the crankshafts 126 being suitably geared together as in Fig. 2. The transverse engine section of Fig. 6 illustrates one bank of cylinders disposed about the engine axis, each cylinder of this transverse section or bank comprising one cylinder of an in-line row of cylinders. With this arrangement the adjacent throws of the two crankshafts 126 together serve one cylinder bank, that is, the cylinders of one transverse section of the engine; and, therefore, the number of cylinder banks and the number of throws of each crankshaft are both equal to the number of cylinders in the in-line cylinder rows.

Fig. 2 is a transverse section through the engine, schematically illustrated in Fig. 2, comprising three cylinder block units 12. The cylinder block units 12 are supported upon the sides of a crankcase 128 of triangular cross section. The three crankshafts 28, suitably geared together, are supported within the triangular crankcase such that the axis of each crankshaft intersects the axes of the cylinders of the two cylinder rows disposed on opposite sides of a corner of the crankcase. With this arrangement the connecting rods 29 for one row of cylinders and the connecting rods for the adjacent row of cylinders of the adjacent cylinder block unit 12 are connected to the same crankshaft, as schematically illustrated in Fig. 1.

The number of cylinder block units 12 may be increased to four with the cylinder blocks secured to the sides of a crankcase 134 of substantially square cross section, as illustrated in Fig. 8. Four crankshafts may be provided adjacent each of the corners of the crankcase; that is, one for each pair of adjacent cylinder rows defining the V-shaped space between adjacent cylinder block units, as in the three cylinder block modification of Fig. 7. However, Fig. 8 illustrates a crankshaft and connecting rod arrangement in which only two crankshafts 136, suitably geared together, are necessary, the previously described offset between the two cylinder rows of each cylinder block unit 12 permitting such an arrangement.

As previously stated, the cylinder block units 12 are all the same, and in each cylinder block unit one row of cylinders is longitudinally offset in the direction of the engine axis relative to the other row of cylinders. Thus, in Fig. 8, the cylinders of cylinder rows 138, 140, 142 and 144 are disposed behind or below the cylinders of cylinder rows 146, 148, 150 and 152. The two crankshafts 136 are each respectively disposed adjacent opposite corners of the crankcase 134 with their axes intersecting the axes of the adjacent cylinder rows. The pistons of the cylinders of row 146 are each provided with a master connecting rod 154 journaled about the crank arms of the adjacent crankshaft 136, and the corresponding pistons of the cylinders of cylinder row 148 are provided with auxiliary connecting rods 156 articulated to said master connecting rods. Similarly, the pistons of cylinder row 144 are provided with master connecting rods 158, and the pistons of cylinder row 142 are provided with auxiliary connecting rods 160 articulated thereto. Each pair of master connecting rods 154 and 158 is similar and is journaled about the same crank arm in side-by-side relation; that is, they are axially offset along their associated crank arm by an amount corresponding to the offset between the cylinder rows 144 and 146. As illustrated, master connecting rods 154 are disposed forwardly of master rods 158.

The pistons of cylinder rows 140 and 150 are respectively provided with master connecting rods 162 and 164 journaled about the crank arms of the other crankshaft 136, and the corresponding pistons of cylinder rows 138 and 152 are provided with auxiliary connecting rods 166 and 168 articulated to the master connecting rods 162 and 164, respectively. Like the master rods 154 and 158, the master rods 162 and 164 are similar and are axially offset along their common crank arms by an amount corresponding to the offset between their associated cylinder rows. As illustrated, the master connecting rods 164 are disposed forwardly of the master rods 162. With this construction, the master connecting rods 154 and 164 and their auxiliary connecting rods 156 and 168 are disposed in the same planes, and master rods 158 and 162 and their auxiliary connecting rods 160 and 166 are disposed in planes offset from the first mentioned planes. In this way only two crankshafts 136 are necessary for the eight in-line rows of cylinders, each crankshaft serving four in-line cylinder rows.

As best seen in the enlarged view of Fig. 10, each of the above described master rods has its split crank arm bearing portion including a bearing cap 170. The bearing cap is provided with reinforcing flanges 172, and, in addition, each master rod hub is provided with projecting ears 174 to which the associated auxiliary connecting rod is articulated.

Fig. 9 illustrates an engine comprising six of the cylinder block units 12. As in Fig. 8, since the two cylinder rows of each cylinder block unit 12 are offset longitudinally in the direction of the engine axis, each of the three crankshafts 176 can serve four rows of cylinders. That is, the axis of each crankshaft 176 is disposed so as to intersect the axes of the cylinders of two pairs of diametrically opposed rows of cylinders, and, as in previous modifications, the crankshafts are geared together for in-phase rotation. Pairs of axially offset master connecting rods 178 and 180 are journaled about each of the crank arms of one of the crankshafts 176, and auxiliary connecting rods 182 and 184 are articulated to the master connecting rods 178 and 180, respectively. The master connecting rods 178 and 180 are connected to the pistons of cylinder rows 179 and 181, respectively, while the auxiliary connecting rods 182 and 184 are connected to the pistons of cylinder rows 183 and 185, respectively. The other two crankshafts 176 are each similarly connected to the pistons of four rows of cylinders. Thus, except for the increase in number of cylinder block units 12 and the addition of a third crankshaft, the arrangement of Fig. 9 is quite similar to that of Fig. 8.

From the construction of Figs. 8 and 9, it is apparent that another advantage of the offset arrangement of the two in-line cylinder rows of each cylinder block unit 12 is that this offset permits each crankshaft to serve four cylinder rows in engines comprising two or more multiples of two cylinder block units. In addition, this offset arrangement permits the use of identical master and auxiliary connecting rods.

In all of the engines illustrated, regardless of the number of cylinder block units 12, the crankshafts all rotate in phase with each other. This construction permits close spacing of the crankshafts and, in addition, permits the use of a frame type connecting rod construction in place of the connecting rods illustrated in the previous modifications. Figs. 11 and 12 illustrate a frame type connecting rod construction for engines respectively comprising four and six of the cylinder block units 12. Since the crankshafts all rotate in phase, a frame construction may be journaled about the adjacent crank arms of the crankshafts. With this arrangement, each frame will have a circular motion of translation; that is, each point on a frame will rotate in a circle having a radius equal to the length of the crank arms. The pistons are connected to the frame by link or connecting rods articulated thereto. With a frame type connecting rod construction it is not necessary to provide additional means for gearing the crankshafts together.

Such an arrangement is illustrated in Fig. 11, which is a transverse section through an engine comprising four of the cylinder block units 12, and illustrating cylinders 182, 184, 186, 188, 190, 192, 194 and 196, each of which comprises one cylinder of an in-line row of cylinders and which together define a bank of cylinders disposed about the engine axis. Frames 198 each comprising three sections 200, 202 and 204 are clamped together and journaled about each of the crank arms of two crankshafts 206. Thus, the number of frames 198 corresponds to the number of throws of the crankshafts 206, each frame serving one bank of cylinders disposed about the engine axis. Pairs of link rods 208 and 210 are articulated at their inner ends to the frame 198 about common pins 212 carried by the frame. The outer ends of each pair of link rods 208 and 210 are respectively connected to a pair of adjacent pistons in one of the cylinder banks, but of different cylinder block units. In this way the number of pins 212 carried by each frame 198 is equal to the number of pairs of cylinders per cylinder bank and each pin 212 is disposed so that it rotates about an axis intersecting the axes of the pistons to which the associated pair of link rods 208 and 210 are connected. As previously described, the two rows of cylinders of each cylinder block unit 12 are offset relative to each other in the direction of the engine axis, and, therefore, cylinders 184 and 186 are offset relative to each other. Similarly, cylinders 188 and 190, 192 and 194, and 196 and 182 are offset relative to each other. Accordingly, each pair of link rods 208 and 210 are articulated to their pins 212 in side-by-side relation, and, therefore, can be made similar. However, here it should be noted that this offset arrangement of the two cylinder rows of each cylinder block unit is not essential, since in lieu thereof forked type connecting or link rods could be provided.

Fig. 12 is a transverse section through an engine similar to that of Fig. 11, but comprising six cylinder block units 12 instead of four such units. Also, three crankshafts 214 are provided and a three-section frame 216 comprising sections 218, 220 and 222 are clamped together and journaled about the crankshafts 214. The pistons of the various cylinders are connected to the frame 216 by link rods 224 and 226 articulated to the frame about common pins 228 in a manner similar to the link rods 208 and 210 of Fig. 11. Fig. 13 is an enlarged detailed view illustrating a pair of similar link rods 224 and 226 articulated about a common pin 228 carried by the frame 216. The number of crankshafts 214 about which the frames 216 are journaled is not material as long as more than two crankshafts are provided, since it is only essential that the crankshafts prevent rotation of the frame about its geometrical axis. That is, the motion of the frames must be limited to a circular motion of translation in which each point on the frames has a circular path with a radius equal to the length of the crank arms.

Summarizing, each cylinder block unit 12 comprises a pair of in-line cylinder rows with an odd number of cylinders in each row. In each cylinder block unit the axes of the cylinders are parallel to each other, thereby facilitating machining operations on the cylinder bores. The adjacent cylinders of the two cylinder rows of each cylinder block unit are arranged to fire 360° out of phase as regards engine cycle, whereby their pistons are in phase as regards motion. Accordingly, the crankshafts serving the two rows of cylinders of each cylinder block unit are also connected in phase and may be disposed quite close together. As has been shown, when a plurality of such cylinder block units are symmetrically disposed about a common axis, the result is an engine having a large number of cylinders in which no two cylinders fire at any one time, and in which the cylinders fire at uniform intervals provided that the number of cylinder block units is not the same as the number of cylinders in each row.

Each cylinder block unit is constructed as a complete power unit in itself; that is, each is provided with its own supercharger, magneto, ignition system, fuel injection system, coolant pumps, oil pumps, etc. Thus, the individual cylinder block units may be independently developed, and, starting with an engine comprising but one of such cylinder block units, the size of the engine may be progressively increased by adding additional similar cylinder block units. Each such increase in the size of the engine results in an increasingly smooth engine torque curve, since, as long as the cylinder block units are symmetrically disposed about the engine axis, the engine cylinders fire at uniform intervals with no two cylinders firing at any one time. For example, as illustrated in Figs. 2, 6, 7, 8 and 9, the size of the engine may be readily increased from an engine comprising but one cylinder block unit 12 to an engine comprising six such units. Thus, if each cylinder block unit 12 comprises fourteen cylinders, that is, seven cylinders per row, the six-block engine will comprise eighty-four cylinders having a uniform firing interval, such that some cylinder fires approximately every 8½° of crankshaft rotation.

The cylinder block units 12 have been described as comprising two rows of cylinders with parallel bores and with an odd number of cylinders per row. It should be apparent that even with but one cylinder per row, the engine cylinders still fire at uniform intervals. Thus, in Fig. 2 if the engine comprises only the bank of two cylinders visible in the drawing, one of the two cylinders will fire every 360°. Similarly, Figs. 6, 7, 8 and 9 all illustrate transverse engine sections through one bank of cylinders about the axes of engines respectively comprising 2, 3, 4 and 6 cylinder block units 12. In each case there is a uniform firing interval between the cylinders of each bank. For example, as is apparent from the table indicating the firing order of the cylinders of the engine illustrated in Figs. 1 and 7, the number one cylinders of each row fire at uniform intervals of 120° and the number two, three, four and five cylinders of each row fire at similar uniform intervals. In other words, each bank of cylinders in a transverse plane through any of the engines comprising one or more of the cylinder block units 12 itself also provides an engine in which the cylinders fire at uniform intervals. That is, a plurality of pairs of cylinders, in which each pair of cylinders has parallel axes and fires at 360° intervals, may be combined about a crankshaft means as illustrated in Figs. 6, 7, 8 and 9 with the result that the cylinders fire at uniform intervals. Such an arrangement, comprising four, six, eight, etc. pairs of cylinders, has the inherent advantage that all shaking forces of a frequency higher than the crankshaft speed cancel each other. The unbalance forces of crankshaft frequency, common to all engines, can be balanced in the usual manner by counterweights.

Such an eight cylinder engine 230 is illustrated in Figs. 17 and 18. Engine 230 comprises four diametrically opposed pairs of parallel cylinders 231 and 232, two crankshafts 234 each with one crank arm 236, and a frame structure 240 journaled about said crank arm. The frame structure 240 is similar to that illustrated in Fig. 11 and comprises three sections 242, 244 and 246 clamped together and journaled about the crank arms 236. Link rods 248 and 250 are connected at one end to the pistons of cylinders 231 and 232, respectively, and are articulated at their other ends about pins 252 carried by the frame structure 240. The cylinders 231 and 232 are slightly offset relative to each other in the direction of the engine axis just as the pairs of cylinder rows comprising each cylinder block unit 12 are offset. With the cylinders 231 and 232 offset in this manner, the link rods 248 and 250 may be articulated about the pins 252 in side-by-side relation, and, therefore, may be similarly constructed. Here again, this offset construction is not essential and in lieu thereof forked type connecting rods may be provided.

The crankshafts 234 are geared to a drive shaft 254 by pinions 256 carried at one end of each of the crankshafts and engaging an internal gear 258 rigid with the drive shaft 254. The other end of each of the crankshafts 234 is provided with pinions 260 in mesh with a gear 262 on a shaft 264 disposed on the engine axis. The shaft 264 is a drive shaft for a supercharger impeller 266 having an annular air intake opening 268. The supercharger impeller compresses the combustion air into an annular manifold 270 from whence it is distributed to the engine cylinders through intake pipes 272. The crankshafts 234 are also provided with pinion gears 274, each in mesh with a pair of gears 276, each drivably connected to a cam shaft 278. (Only one gear 276 and associated cam shaft has been illustrated on the drawing.) Each of the cam shafts 278 is provided with cams 280 for operating the valves of a pair of cylinders 231 and 232. Fig. 17 discloses one of the gears 276 with the associated cam shaft 278 and one of its cams 280. Each of the engine driven cams 280 is adapted to control one of the cylinder valves through a suitable valve gear. For example, as illustrated, the valve gear comprises a cam follower 282 operatively connected to a push-rod 284 which is adapted to open a cylinder valve 286 through a rocker arm 288, the valve being biased toward its closed position by a spring 290.

As previously stated, in the eight cylinder engine 230, for each reciprocating part there is a similar opposite reciprocating part, and, therefore, the engine may be completely balanced. Counterweights 292 are provided to counterbalance the eccentrically rotating masses. However, particularly at low engine speeds, when the frame 240 is in the position illustrated in the drawing, that is, with the two crank arms disposed in a common plane with the axes of the two crankshafts, the frame connection between the crankshafts is momentarily unstable and does not positively insure rotation of the crankshafts in the same direction. Although the two crankshafts are suitably geared together by gears 256 and 258, this momentary unstability may make the gears 256 and 258 noisy. As schematically illustrated in Fig. 19, this difficulty is eliminated by providing each of the crankshafts with a second crank arm 294, preferably at 90° to the other crank arms 236, and a link 296 pivotally intersects the two crank arms 294. In this way the frame 240 together with the link 296 positively insures smooth synchronous rotation of the crankshafts 234. Thus, if each crankshaft is a multi-throw crankshaft, as contemplated in Fig. 11, with the crankarms of each crankshaft angularly disposed relative to each other, then no such unstability can occur. Also, if three crankshafts were provided instead of two, this unstability of the connecting rod frame would not be present.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An internal combustion engine comprising a pair of side-by-side in-line cylinder rows, each of said cylinder rows comprising an equal uneven number of cylinders, said cylinders having parallel bores, an air induction manifold chamber for said cylinders disposed between said pair of cylinder rows, and spark plugs extending from said chamber into communication with said cylinders for causing ignition within said cylinders.

2. An internal combustion engine comprising a pair of side-by-side in-line cylinder rows, a supercharged air induction chamber for the cylinders of said rows and disposed between said rows, and spark plugs extending from said chamber into communication with said cylinders for causing ignition within said cylinders.

3. An internal combustion engine comprising a plurality of cylinders, a supercharged air induction chamber for said cylinders, and spark plugs extending from said chamber into communication with said cylinders for causing igntion within said cylinders.

4. An internal combustion engine comprising a cylinder, air induction passage means for said cylinder, and a spark plug extending from said chamber into communication with said cylinders for causing ignition within said cylinders.

5. A four-stroke cycle internal combustion engine comprising a pair of side-by-side in-line cylinder rows, each of said cylinder rows comprising an equal uneven number of cylinders, the cylinders of each row being arranged to fire sequentially at uniform intervals with the cylinders of one row and the corresponding cylinders of the other row being arranged to fire 360° out of phase as regards engine cycle.

6. A four-cycle internal combustion engine comprising a pair of side-by-side in-line cylinder rows with the one row of cylinders offset along its line of cylinders relative to the other row of cylinders, the cylinders of each row being arranged to fire sequentially at uniform intervals with the cylinders of one row and the corresponding cylinders of the other row being arranged to fire 360° out of phase as regards engine cycle.

7. A four-stroke cycle internal combustion engine comprising a pair of side-by-side in-line cylinder rows, each of said cylinder rows comprising an equal uneven number of cylinders with all the cylinders having parallel bores, the cylinders of each row being arranged to fire sequentially at uniform intervals with the cylinders of one row and the corresponding cylinders of the other row being arranged to fire 360° out of phase as regards engine cycle.

8. A four-stroke cycle internal combustion engine comprising a plurality of pairs of side-by-side in-line cylinder rows, said pairs of cylinder rows being symmetrically disposed about a common axis, each of said cylinder rows comprising an equal uneven number of cylinders with the cylinders of each pair of rows having parallel bores, the cylinders of each row being arranged to fire sequentially at uniform intervals with the adjacent cylinders of each pair of rows being arranged to fire 360° out of phase as regards engine cycle.

9. A multi-cylinder internal combustion engine comprising a plurality of pairs of engine cylinders, said pairs of cylinders being symmetrically spaced about a common axis with the cylinders of each pair having parallel axes extending transverse to and spaced from opposite sides of said common axis, the cylinders of each pair being arranged to fire 360° out of phase as regards engine cycle.

10. An eight-cylinder internal combustion engine comprising four pairs of engine cylinders, said pairs of cylinders being symmetrically spaced about a common axis with the cylinders of each pair disposed in side-by-side relation transversely of said axis and being arranged to fire 360° out of phase as regards engine cycle.

11. An eight-cylinder internal combustion engine comprising four pairs of engine cylinders, said pairs of cylinders being symmetricall spaced about a common axis with the cylinders of each pair having parallel bores transversely of said axis and being arranged to fire 360° out of phase as regards engine cycle.

12. An eight-cylinder internal combustion engine comprising four pairs of engine cylinders and associated pistons, said pairs of cylinders being symmetrically spaced about a common axis with the cylinders of each pair disposed in side-by-side relation and being arranged to fire 360° out of phase as regards engine cycle, a plurality of side-by-side in phase crankshafts connected together for joint rotation, and connecting rod means interconnecting said pistons and crankshafts.

13. An internal combustion engine comprising a plurality of engine cylinder block units radially disposed and symmetrically spaced about a common axis, each of said cylinder block units comprising exactly two side-by-side in-line cylinder rows with the cylinders of each block unit having parallel bores, each of the in-line rows of cylinders comprising an equal odd number of cylinders differing in number from the number of cylinder block units.

14. An internal combustion engine comprising a plurality of engine cylinder block units radially disposed and symmetrically spaced about a common axis, each of said cylinder block units comprising exactly two side in-line cylinder rows with the cylinders of each block unit having parallel bores, and a plurality of multi-throw crankshafts connected together for in-phase rotation and operatively connected to the pistons of said cylinders, each of the in-line rows of cylinders comprising an equal odd number of cylinders differing in number from the number of cylinder block units.

15. An internal combustion engine comprising a plurality of engine cylinder block units radially disposed and symmetrically spaced about a common axis, the number of such cylinder block units being equal to two or more multiples of two such units, each of said cylinder block units comprising a pair of side-by-side in-line cylinder rows with the cylinders of each cylinder block unit having parallel bores, and a plurality of multi-throw crankshafts connected together for in-phase rotation, each of said crankshafts being connected to the pistons of four of the cylinder rows.

16. An internal combustion engine comprising a plurality of engine cylinder block units radially disposed and symmetrically spaced about a common axis, the number of such cylinder block units being equal to two or more multiples of two such units, each of said cylinder block units comprising a pair of side-by-side in-line cylinder rows each having the same odd number of cylinders with the cylinders of each cylinder block unit having parallel bores, and a plurality of multi-throw crankshafts connected together for in-phase rotation, each of said crankshafts being connected to the pistons of four of the cylinder rows, each of said four cylinder rows comprising two pairs of diametrically opposed cylinder rows.

17. An internal combustion engine comprising a plurality of engine cylinder block units radially disposed and symmetrically spaced about a common axis, the number of such cylinder black units being equal to two or more multiples of two such units, each of said cylinder block units having a similar arrangement of cylinders comprising a pair of side-by-side parallel in-line cylinder rows each having the same odd number of cylinders with the cylinders of each cylinder block unit having parallel bores, one of the in-line cylinder rows of each cylinder block unit being displaced in a direction along its line of cylinders relative to the other in-line cylinder row of said cylinder block unit, and a plurality of multi-throw crankshafts connected together for in-phase rotation, connecting rod means connecting each of said crankshafts to the pistons of four of the cylinder rows.

18. An internal combustion engine comprising a plurality of engine cylinder block units radially disposed and symmetrically spaced about a common axis, the number of such cylinder block units being equal to two or more multiples of two such units, each of said cylinder block units having a similar arrangement of cylinders comprising a pair of side-by-side parallel in-line cylinder rows each having the same odd number of cylinders with the cylinders of each cylinder block unit having parallel bores, one of the in-line cylinder rows of each cylinder block unit being displaced in a direction along its line of cylinders relative to the other in-line cylinder row of said cylinder block unit, and a plurality of multi-throw crankshafts connected together for in-phase rotation, connecting rod means connecting each of said crankshafts to the pistons of four of the cylinder rows, said connecting rod means comprising a plurality of pairs of master connecting rods, each having an auxiliary connecting rod articulated thereto, each pair of master connecting rods being journaled about one of the crankshaft crankarms in side-by-side relation.

19. In an internal combustion engine comprising a plurality of engine cylinder block units circumferentially spaced and radially disposed about a common axis, each of said cylinder block units comprising a pair of side-by-side cylinder and piston rows with the cylinders of each block unit having parallel bores, a plurality of side-by-side parallel multi-throw crankshafts, frame means connecting the side-by-side crankarms of said crankshafts in in-phase relation, and a plurality of pairs of link rods, each pair of link rods having one of their ends pivotally connected to one of said frames about a common axis and being connected at their other ends to a pair of pistons disposed on opposite sides of one of the intercylinder block spaces.

20. An internal combustion engine comprising a cylinder block unit having exactly two adjacent side-by-side in-line cylinder rows with the cylinders having parallel bores, a piston for each of said cylinders, and a plurality of multi-throw crankshafts connected together for in-phase rotation and operatively connected to said pistons, each of said in-line cylinder rows comprising an equal odd number of cylinders.

21. An internal combustion engine comprising a pair of side-by-side in-line cylinder rows, each of said rows of cylinders comprising an equal odd number of cylinders, said cylinders having parallel bores and each cylinder in one row and the adjacent cylinder of the other row being arranged to fire 360° out of phase as regards engine cycle.

WILTON G. LUNDQUIST.

REFERENCES CITED

The following references are of record in the file of this patent:

UNITED STATES PATENTS

| Number | Name | Date |
|---|---|---|
| 1,138,077 | Buchi | May 4, 1915 |
| 1,223,071 | Holveck | Apr. 17, 1917 |
| 1,303,954 | Park | May 20, 1919 |
| 1,341,709 | Dodge et al. | June 1, 1920 |
| 1,679,794 | Smith | Aug. 7, 1928 |
| 1,711,882 | Fornaca | May 7, 1929 |
| 1,780,947 | Schron | Nov. 11, 1930 |
| 1,881,027 | Manning | Oct. 4, 1932 |
| 2,234,918 | Linthwaite | Mar. 11, 1941 |
| 2,283,606 | Lewis | May 19, 1942 |
| 2,288,820 | Mas | July 7, 1942 |

FOREIGN PATENTS

| Number | Country | Date |
|---|---|---|
| 632,090 | France | 1927 |
| 799,519 | France | 1936 |
| 515,673 | Great Britain | 1937 |